(12) United States Patent
Xia

(10) Patent No.: US 9,942,874 B2
(45) Date of Patent: Apr. 10, 2018

(54) METHOD AND APPARATUS FOR TRANSMITTING SYSTEM INFORMATION, AND METHOD AND APPARATUS FOR RECEIVING SYSTEM INFORMATION

(71) Applicant: Huawei Technologies Co., Ltd., Shenzhen (CN)

(72) Inventor: Jinhuan Xia, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/248,678

(22) Filed: Aug. 26, 2016

(65) Prior Publication Data
US 2016/0366665 A1 Dec. 15, 2016

Related U.S. Application Data

(63) Continuation of application No. PCT/CN2014/072622, filed on Feb. 27, 2014.

(51) Int. Cl.
*H04W 68/00* (2009.01)
*H04W 68/02* (2009.01)
(Continued)

(52) U.S. Cl.
CPC ........... *H04W 68/02* (2013.01); *H04W 28/06* (2013.01); *H04W 72/02* (2013.01)

(58) Field of Classification Search
CPC ..... H04W 68/02; H04W 28/06; H04W 72/02; H04W 72/04; H04W 72/00; H04W 72/005
(Continued)

(56) References Cited

U.S. PATENT DOCUMENTS 7,450,933 B2 * 11/2008 Kwak .................... H04H 60/91
370/259
7,546,132 B2 * 6/2009 Lee ..................... H04W 72/005
370/312
(Continued)

FOREIGN PATENT DOCUMENTS

CN      102123405 A    7/2011
CN      102651890 A    8/2012
(Continued)

OTHER PUBLICATIONS

"System Information for coverage extended UE," 3GPP TSG-RAN WG2#85, R2-140718, Prague. Czech Republic, 3$^{rd}$ Generation Partnership Project, Valbonne, France (Feb. 10-14, 2014).

*Primary Examiner* — Marceau Milord
(74) *Attorney, Agent, or Firm* — Leydig, Voit & Mayer, Ltd.

(57) ABSTRACT

Disclosed is a method and an apparatus for transmitting system information, and a method and an apparatus for receiving system information. The method includes: acquiring, by a base station, a preset modification period of enhanced system information, where the enhanced system information is system information on which enhanced transmission needs to be performed; the modification period of the enhanced system information is an integer multiple of a modification period of non-enhanced system information; and the non-enhanced system information is system information that is transmitted, based on scheduling by using a control channel, in a system information window; and transmitting the enhanced system information in an enhanced transmission manner in the modification period of the enhanced system information according to a configured
(Continued)

time-sequence location. According to the methods or the apparatuses in the present disclosure, occupied transmission resources can be reduced.

20 Claims, 5 Drawing Sheets

(51) Int. Cl.
*H04W 28/06* (2009.01)
*H04W 72/02* (2009.01)

(58) Field of Classification Search
USPC .................................... 455/458, 404.1, 460
See application file for complete search history.

(56) References Cited

U.S. PATENT DOCUMENTS

| | | | | |
|---|---|---|---|---|
| 7,558,228 | B2* | 7/2009 | Lee ...................... | H04L 12/189 370/312 |
| 8,144,735 | B2* | 3/2012 | Vayanos ............... | H04W 48/12 370/312 |
| 8,948,194 | B2* | 2/2015 | Gao ..................... | H04W 72/005 370/235 |
| 9,468,017 | B2* | 10/2016 | Xia ..................... | H04W 72/042 |
| 9,699,710 | B2* | 7/2017 | Lee ...................... | H04W 48/12 |
| 2005/0282528 | A1* | 12/2005 | Charpentier .......... | H04L 12/189 455/414.2 |
| 2006/0030342 | A1* | 2/2006 | Hwang ................. | H04N 21/21 455/466 |
| 2006/0067361 | A1* | 3/2006 | Lee ..................... | H04W 72/005 370/466 |
| 2006/0146858 | A1* | 7/2006 | Kim ..................... | H04W 72/005 370/432 |
| 2008/0045224 | A1* | 2/2008 | Lu ....................... | H04W 72/005 455/446 |
| 2008/0291866 | A1* | 11/2008 | Fukui ................. | H04W 56/0015 370/328 |
| 2008/0318566 | A1* | 12/2008 | Chun .................... | H04W 48/12 455/422.1 |
| 2009/0116418 | A1* | 5/2009 | Lee ..................... | H04W 72/005 370/312 |
| 2009/0181661 | A1* | 7/2009 | Kitazoe ................ | H04W 48/12 455/418 |
| 2010/0046451 | A1* | 2/2010 | Tada ...................... | H04W 4/10 370/329 |
| 2010/0165901 | A1* | 7/2010 | Kim ..................... | H04W 72/005 370/312 |
| 2012/0230347 | A1* | 9/2012 | Gao ..................... | H04W 72/005 370/432 |
| 2013/0114484 | A1* | 5/2013 | Suzuki ................ | H04W 68/025 370/311 |
| 2014/0056220 | A1* | 2/2014 | Poitau ................. | H04W 40/246 370/328 |
| 2014/0112180 | A1* | 4/2014 | Axmon ................ | H04W 24/10 370/252 |
| 2014/0328329 | A1* | 11/2014 | Novlan ............... | H04W 72/042 370/336 |
| 2015/0181575 | A1* | 6/2015 | Ng ...................... | H04L 5/0092 370/329 |

FOREIGN PATENT DOCUMENTS

| | | |
|---|---|---|
| EP | 2466977 A1 | 6/2012 |
| WO | WO 2012177203 A1 | 12/2012 |
| WO | WO 2013183966 A1 | 12/2013 |

* cited by examiner

501 — A terminal acquires enhanced system information transmitted by a base station in an enhanced transmission manner in a modification period of the enhanced system information according to a configured time-sequence location

FIG. 5

601 — A terminal acquires enhanced system information transmitted by a base station in an enhanced transmission manner in a modification period of the enhanced system information according to a configured time-sequence location 602 — Acquire an enhanced paging message transmitted by the base station in the enhanced transmission manner in a preset time period in a modification period of non-enhanced system information within the modification period of the enhanced system information 603 — Acquire, based on an identifier included in the enhanced paging information, changed enhanced system information

FIG. 6

METHOD AND APPARATUS FOR TRANSMITTING SYSTEM INFORMATION, AND METHOD AND APPARATUS FOR RECEIVING SYSTEM INFORMATION

CROSS-REFERENCE TO RELATED APPLICATIONS

This application is a continuation of International Application No. PCT/CN2014/072622, filed on Feb. 27, 2014, which is hereby incorporated by reference in its entirety.

TECHNICAL FIELD

The present disclosure relates to the field of network communications technologies, and in particular, to a method and an apparatus for transmitting system information, and a method and an apparatus for receiving system information.

BACKGROUND

It is well known that, in a communications network, power of a signal received by a terminal is directly affected by an environment in which the terminal is located. In a relatively harsh environment, a terminal that originally can perform communication normally cannot perform communication normally due to excessively low received signal power.

For example, in a same area within coverage of a same base station, power of a signal received by a terminal located in a basement is generally lower than power of a signal received by a terminal located outdoor.

To enable a terminal located in a harsh environment to perform communication normally, a method for performing enhanced transmission on system information required in a communication process of the terminal is used to ensure normal communication of the terminal. The enhanced transmission refers to that information that needs to be transmitted to a terminal is transmitted in multiple subframes for multiple times to ensure that the terminal can receive complete information.

However, in the method for transmitting system information, because multiple subframes (which may be several hundreds of subframes) need to be occupied to transmit the system information, many transmission resources are occupied in a process of transmitting the system information. In a mobile communications system, available transmission resources are limited for the system; therefore, if system information is continuously transmitted in an enhanced transmission manner to a terminal located in a harsh environment, resource overheads are excessively large, leading to insufficient resources for transmitting downlink data by a terminal not located in a harsh environment.

SUMMARY

In view of this, the present disclosure provides a method and an apparatus for transmitting system information, and a method and an apparatus for receiving system information, where system information is periodically transmitted, in an enhanced transmission manner and based on a modification period of system information of a terminal not located in a harsh environment, to a terminal located in a harsh environment, so as to resolve a problem that excessive transmission resources are occupied because system information is continuously transmitted in an enhanced transmission manner to a terminal located in a harsh environment. Specific solutions thereof are as follows:

According to a first possible implementation manner of a first aspect of this application, this application provides a method for transmitting system information, including:

acquiring, by a base station, a preset modification period of enhanced system information, where the enhanced system information is system information on which enhanced transmission needs to be performed; the modification period of the enhanced system information is an integer multiple of a modification period of non-enhanced system information; and the non-enhanced system information is system information that is transmitted, based on scheduling by using a control channel, in a system information window; and transmitting the enhanced system information in an enhanced transmission manner in the modification period of the enhanced system information according to a configured time-sequence location.

With reference to a second possible implementation manner of the first aspect, after the transmitting the enhanced system information in an enhanced transmission manner according to a configured time-sequence location, the method further includes:

when the enhanced system information changes, transmitting an enhanced paging message in the enhanced transmission manner in a preset time period in the modification period of the non-enhanced system information within the modification period of the enhanced system information, where the enhanced paging message is used to notify a terminal that the enhanced system information has changed.

With reference to a specific implementation manner of the second possible implementation manner of the first aspect, the enhanced system information includes shared information and proprietary information, where: the proprietary information is radio resource configuration information related to enhanced transmission; the shared information is radio resource configuration information that is used in both the enhanced transmission manner and a non-enhanced transmission manner; and the proprietary information in a modification period of the enhanced system information is the same, and the shared information in a modification period of the non-enhanced system information is the same; and the transmitting an enhanced paging message in the enhanced transmission manner specifically includes:

transmitting, in the enhanced transmission manner, an enhanced paging message including a first identifier, where the first identifier is used to indicate that the shared information has changed; or transmitting, in the enhanced transmission manner, an enhanced paging message including a second identifier, where the second identifier is used to indicate that the proprietary information has changed; or transmitting, in the enhanced transmission manner, an enhanced paging message including a third identifier, where the third identifier is used to indicate that at least one of the shared information or the proprietary information has changed.

With reference to a third possible implementation manner of the first aspect, the transmitting the enhanced system information in an enhanced transmission manner specifically includes:

transmitting a master information block in the enhanced transmission manner by using a physical broadcast channel; and/or transmitting a system information block in the enhanced transmission manner by using a physical downlink shared channel.

With reference to a second specific implementation manner of the second possible implementation manner of the first aspect, the transmitting an enhanced paging message in the enhanced transmission manner specifically includes:

transmitting the enhanced paging message in the enhanced transmission manner by using a first time-frequency resource, where the first time-frequency resource is different from a second time-frequency resource used for transmitting a non-enhanced paging message.

With reference to a third specific implementation manner of the second possible implementation manner of the first aspect, the transmitting an enhanced paging message in the enhanced transmission manner specifically includes:

when the enhanced paging message and a non-enhanced paging message are transmitted in a same subframe, scrambling the enhanced paging message in a first scrambling manner, where the first scrambling manner is different from a second scrambling manner used for transmitting the non-enhanced paging message.

With reference to a fourth possible implementation manner of the first aspect, before the transmitting the enhanced system information in an enhanced transmission manner in the modification period of the enhanced system information according to a configured time-sequence location, the method further includes:

transmitting, to a terminal by using a physical broadcast channel, information that indicates the time-sequence location, so that the terminal receives the enhanced system information at the time-sequence location.

With reference to a fifth possible implementation manner of the first aspect, the enhanced system information includes at least first information and second information, where the first information includes sub information that indicates a time-sequence location of the second information; and before the transmitting the enhanced system information in an enhanced transmission manner in the modification period of the enhanced system information according to a configured time-sequence location, the method further includes:

transmitting, to a terminal by using a physical broadcast channel, information that indicates a time-sequence location of the first information, so that the terminal receives the first information at the time-sequence location, and receives the second information according to the time-sequence location, indicated by the sub information, of the second information.

According to a first possible implementation manner of a second aspect of this application, this application provides another method for receiving system information, including:

acquiring, by a terminal, enhanced system information transmitted by a base station in an enhanced transmission manner in a modification period of the enhanced system information according to a configured time-sequence location, where the enhanced system information is system information on which enhanced transmission needs to be performed; the modification period of the enhanced system information is an integer multiple of a modification period of non-enhanced system information; and the non-enhanced system information is system information that is transmitted, based on scheduling by using a control channel, in a system information window.

With reference to a second possible implementation manner of the second aspect, after the acquiring, by a terminal, enhanced system information transmitted by a base station in an enhanced transmission manner in a modification period of the enhanced system information according to a configured time-sequence location, the method further includes:

acquiring an enhanced paging message transmitted by the base station in the enhanced transmission manner in a preset time period in the modification period of the non-enhanced system information within the modification period of the enhanced system information, where the enhanced paging message is used to notify the corresponding terminal that the enhanced system information has changed; and acquiring, based on an identifier included in the enhanced paging information, changed enhanced system information.

With reference to a specific implementation manner of the second possible implementation manner of the second aspect, the enhanced system information includes shared information and proprietary information, where: the proprietary information is radio resource configuration information related to enhanced transmission; the shared information is radio resource configuration information that is used in both the enhanced transmission manner and a non-enhanced transmission manner; and the proprietary information in a modification period of the enhanced system information is the same; the shared information in a modification period of the non-enhanced system information is the same; and the acquiring, based on an identifier included in the enhanced paging information, changed enhanced system information specifically includes:

identifying a first identifier included in the enhanced paging information, where the first identifier is used to indicate that the shared information has changed;

stopping current communication; and receiving the changed enhanced system information when a next modification period of the enhanced system information comes.

With reference to a second specific implementation manner of the second possible implementation manner of the second aspect, the enhanced system information includes shared information and proprietary information, where: the proprietary information is radio resource configuration information related to enhanced transmission; the shared information is radio resource configuration information that is used in both the enhanced transmission manner and a non-enhanced transmission manner; and the proprietary information in a modification period of the enhanced system information is the same; the shared information in a modification period of the non-enhanced system information is the same; and the acquiring, based on an identifier included in the enhanced paging information, changed enhanced system information specifically includes:

identifying a second identifier included in the enhanced paging information, where the second identifier is used to indicate that the proprietary information has changed;

performing communication by continuing to use current enhanced system information; and receiving the changed enhanced system information when a next modification period of the enhanced system information comes.

With reference to a third specific implementation manner of the second possible implementation manner of the second aspect, the enhanced system information includes shared information and proprietary information, where: the proprietary information is radio resource configuration information related to enhanced transmission; the shared information is radio resource configuration information that is used in both the enhanced transmission manner and a non-enhanced transmission manner; and the proprietary information in a modification period of the enhanced system information is the same; the shared information in a modification period of the non-enhanced system information is the same; and the acquiring, based on an identifier included in the enhanced paging information, changed enhanced system information specifically includes:

identifying a third identifier included in the enhanced paging information, where the third identifier is used to indicate that at least one of the shared information or the proprietary information has changed;

stopping communication that is being currently performed; and receiving the changed enhanced system information when a next modification period of the enhanced system information comes.

With reference to a specific implementation manner of the second specific implementation manner of the second possible implementation manner of the second aspect, the receiving the changed enhanced system information when a next modification period of the enhanced system information comes specifically includes:

receiving the proprietary information in the changed enhanced system information when the next modification period of the enhanced system information comes.

With reference to a third possible implementation manner of the second aspect, before the acquiring, by a terminal, enhanced system information transmitted by a base station in an enhanced transmission manner in a modification period of the enhanced system information according to a configured time-sequence location, the method further includes:

receiving information that indicates the time-sequence location and that is transmitted by the base station by using a physical broadcast channel.

With reference to a fourth possible implementation manner of the second aspect, the enhanced system information includes at least first information and second information, where the first information includes sub information that indicates a time-sequence location of the second information;

before the acquiring, by a terminal, enhanced system information transmitted by a base station in an enhanced transmission manner in a modification period of the enhanced system information according to a configured time-sequence location, the method further includes:

receiving information that indicates a time-sequence location of the first information and that is transmitted by the base station by using a physical broadcast channel; and the acquiring, by a terminal, enhanced system information transmitted by a base station in an enhanced transmission manner in a modification period of the enhanced system information according to a configured time-sequence location specifically includes:

receiving the first information at the time-sequence location of the first information; and receiving the second information at the time-sequence location, indicated by the sub information in the first information, of the second information.

According to a first possible implementation manner of a third aspect of this application, this application provides an apparatus for transmitting system information, including:

an acquiring unit, configured to acquire a preset modification period of enhanced system information, where the enhanced system information is system information on which enhanced transmission needs to be performed; the modification period of the enhanced system information is an integer multiple of a modification period of non-enhanced system information; and the non-enhanced system information is system information that is transmitted, based on scheduling by using a control channel, in a system information window; and a transmission unit, configured to transmit the enhanced system information in an enhanced transmission manner in the modification period of the enhanced system information according to a configured time-sequence location of a period.

With reference to a second possible implementation manner of the third aspect, the transmission unit is further configured to:

after transmitting the enhanced system information in the enhanced transmission manner according to the configured time-sequence location and when the enhanced system information changes, transmit an enhanced paging message in the enhanced transmission manner in a preset time period in the modification period of the non-enhanced system information within the modification period of the enhanced system information, where the enhanced paging message is used to notify the corresponding terminal that the enhanced system information has changed.

With reference to a specific implementation manner of the second possible implementation manner of the third aspect, the enhanced system information includes shared information and proprietary information, where: the proprietary information is radio resource configuration information related to enhanced transmission; the shared information is radio resource configuration information that is used in both the enhanced transmission manner and a non-enhanced transmission manner; and the proprietary information in a modification period of the enhanced system information is the same, and the shared information in a modification period of the non-enhanced system information is the same; and the transmission unit is specifically configured to:

transmit, in the enhanced transmission manner, an enhanced paging message including a first identifier, where the first identifier is used to indicate that the shared information has changed; or transmit, in the enhanced transmission manner, an enhanced paging message including a second identifier, where the second identifier is used to indicate that the proprietary information has changed; or transmit, in the enhanced transmission manner, an enhanced paging message including a third identifier, where the third identifier is used to indicate that at least one of the shared information or the proprietary information has changed.

With reference to a third possible implementation manner of the third aspect, the transmission unit is specifically configured to:

transmit a master information block in the enhanced transmission manner by using a physical broadcast channel; and/or transmit a system information block in the enhanced transmission manner by using a physical downlink shared channel.

With reference to a second specific implementation manner of the second possible implementation manner of the third aspect, the transmission unit is specifically configured to:

transmit the enhanced paging message in the enhanced transmission manner by using a first time-frequency resource, where the first time-frequency resource is different from a second time-frequency resource used for transmitting a non-enhanced paging message.

With reference to a third specific implementation manner of the second possible implementation manner of the third aspect, the transmission unit is specifically configured to:

when the enhanced paging message and a non-enhanced paging message are transmitted in a same subframe, scramble the enhanced paging message in a first scrambling manner, where the first scrambling manner is different from a second scrambling manner used for transmitting the non-enhanced paging message.

With reference to a fourth possible implementation manner of the third aspect, the transmission unit is further configured to:

before transmitting the enhanced system information in the enhanced transmission manner in the modification period of the enhanced system information according to the configured time-sequence location, transmit, to a terminal by using a physical broadcast channel, information that indicates the time-sequence location, so that the terminal receives the enhanced system information at the time-sequence location.

With reference to a fifth possible implementation manner of the third aspect, the enhanced system information includes at least first information and second information, where the first information includes sub information that indicates a time-sequence location of the second information; and the transmission unit is further configured to:

before transmitting the enhanced system information in the enhanced transmission manner in the modification period of the enhanced system information according to the configured time-sequence location, transmit, to a terminal by using a physical broadcast channel, information that indicates a time-sequence location of the first information, so that the terminal receives the first information at the time-sequence location, and receives the second information according to the time-sequence location, indicated by the sub information, of the second information.

According to a first possible implementation manner of a fourth aspect of this application, this application provides an apparatus for receiving system information, including:

an acquiring unit, configured to acquire enhanced system information transmitted by a base station in an enhanced transmission manner in a modification period of the enhanced system information according to a configured time-sequence location, where the enhanced system information is system information on which enhanced transmission needs to be performed; the modification period of the enhanced system information is an integer multiple of a modification period of non-enhanced system information; and the non-enhanced system information is system information that is transmitted, based on scheduling by using a control channel, in a system information window.

With reference to a second possible implementation manner of the fourth aspect, the acquiring unit is further configured to:

after the terminal acquires the enhanced system information transmitted by the base station in the enhanced transmission manner in the modification period of the enhanced system information according to the configured time-sequence location, acquire an enhanced paging message transmitted by the base station in the enhanced transmission manner in a preset time period in the modification period of the non-enhanced system information within the modification period of the enhanced system information, where the enhanced paging message is used to notify the corresponding terminal that the enhanced system information has changed;

the apparatus further includes a processing unit, configured to identify an identifier included in the enhanced paging information; and the acquiring unit is further configured to acquire, based on the identifier included in the enhanced paging information, changed enhanced system information.

With reference to a specific implementation manner of the second possible implementation manner of the fourth aspect, the enhanced system information includes shared information and proprietary information, where: the proprietary information is radio resource configuration information related to enhanced transmission; the shared information is radio resource configuration information that is used in both the enhanced transmission manner and a non-enhanced transmission manner; and the proprietary information in a modification period of the enhanced system information is the same, and the shared information in a modification period of the non-enhanced system information is the same; the processing unit is specifically configured to:

identify a first identifier included in the enhanced paging information, where the first identifier is used to indicate that the shared information has changed; and stop communication that is being currently performed; and the acquiring unit is specifically configured to receive the changed enhanced system information when a next modification period of the enhanced system information comes.

With reference to a second specific implementation manner of the second possible implementation manner of the fourth aspect, the enhanced system information includes shared information and proprietary information, where: the proprietary information is radio resource configuration information related to enhanced transmission; the shared information is radio resource configuration information that is used in both the enhanced transmission manner and a non-enhanced transmission manner; and the proprietary information in a modification period of the enhanced system information is the same, and the shared information in a modification period of the non-enhanced system information is the same; the processing unit is specifically configured to:

identify a second identifier included in the enhanced paging information, where the second identifier is used to indicate that the proprietary information has changed; and perform communication by continuing to use current enhanced system information; and the acquiring unit is specifically configured to receive the changed enhanced system information when a next modification period of the enhanced system information comes.

With reference to a third specific implementation manner of the second possible implementation manner of the fourth aspect, the enhanced system information includes shared information and proprietary information, where: the proprietary information is radio resource configuration information related to enhanced transmission; the shared information is radio resource configuration information that is used in both the enhanced transmission manner and a non-enhanced transmission manner; and the proprietary information in a modification period of the enhanced system information is the same, and the shared information in a modification period of the non-enhanced system information is the same; the processing unit is specifically configured to:

identify a third identifier included in the enhanced paging information, where the third identifier is used to indicate that at least one of the shared information or the proprietary information has changed; and stop communication that is being currently performed; and the acquiring unit is specifically configured to receive the changed enhanced system information when a next modification period of the enhanced system information comes.

With reference to a fourth specific implementation manner of the second possible implementation manner of the fourth aspect, the acquiring unit is specifically configured to:

receive the proprietary information in the changed enhanced system information when a next modification period of the enhanced system information comes.

With reference to a third possible implementation manner of the fourth aspect, the enhanced system information includes at least first information and second information, where the first information includes sub information that indicates a time-sequence location of the second information;

the acquiring unit is further configured to:

before acquiring the enhanced system information transmitted by the base station in the enhanced transmission manner in the modification period of the enhanced system information according to the configured time-sequence location, receive information that indicates a time-sequence location of the first information and that is transmitted by the base station by using a physical broadcast channel; and the acquiring unit is specifically configured to:

receive the first information at the time-sequence location of the first information; and receive the second information at the time-sequence location, indicated by the sub information in the first information, of the second information.

As can be seen from the foregoing technical solutions that, according to the method and the apparatus for transmitting system information, and the method and the apparatus for receiving system information in this application, enhanced system information is transmitted in an enhanced transmission manner in a modification period of the enhanced system information according to a configured time-sequence location. Two adjacent transmission periods of the eSI are discontinuous, and there may be multiple transmission periods; therefore, occupied transmission resources can be reduced.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

FIG. 5 is a flowchart of Embodiment 1 of a method for receiving system information according to this application;

FIG. 6 is a flowchart of Embodiment 2 of a method for receiving system information according to this application;

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Methods and apparatuses in the embodiments of this application are mainly applied to a terminal requiring coverage enhancement. The terminal requiring coverage enhancement refers to a terminal that can perform communication normally only when enhanced transmission is performed by a base station on a network signal when the network signal received by the terminal has relatively poor quality. Generally, the terminal requiring coverage enhancement may be a terminal located in a relatively harsh environment.

Figure 1:
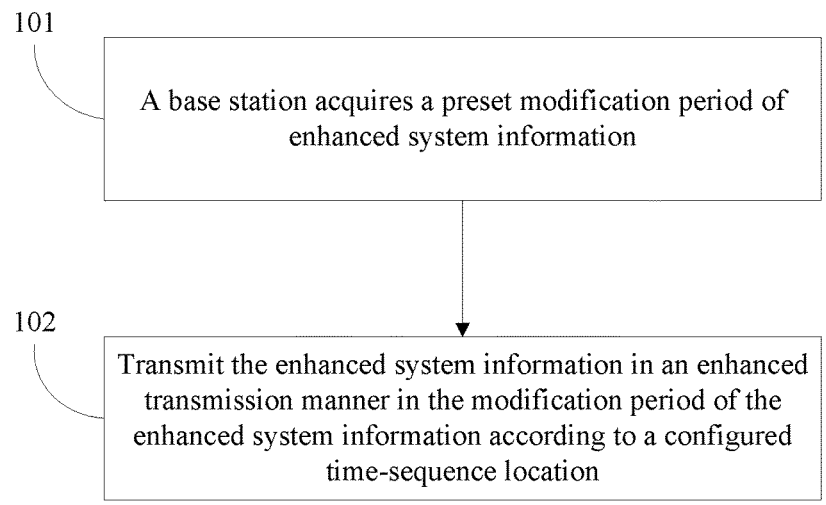
FIG. 1 is a flowchart of Embodiment 1 of a method for transmitting system information according to this application.

FIG. 1 is a flowchart of Embodiment 1 of a method for transmitting system information according to this application. As shown in FIG. 1, the method may include:

Step 101: A base station acquires a preset modification period of enhanced system information, where the enhanced system information is system information on which enhanced transmission needs to be performed; the modification period of the enhanced system information is an integer multiple of a modification period of non-enhanced system information; and the non-enhanced system information is system information that is transmitted, based on scheduling of a control channel, in a system information window.

A meaning of the non-enhanced system information is the same as or similar to that of system information (SI). The non-enhanced system information may be scheduled based on a physical downlink control channel (PDCCH), and may be transmitted in the system information window for multiple times. That is, system information is carried on a physical downlink shared channel (PDSCH); if the PDCCH channel is transmitted in a subframe of the system information window, and the channel is used to schedule the PDSCH channel that carries the system information, the system information is transmitted in the subframe, and is carried on the PDSCH channel. The system information window may be a transmission period of system information. A terminal, that is, user equipment (UE), detects, in each subframe of the system information window, scheduling information that is related to system information and that is carried on the PDCCH. If the scheduling information is detected, it indicates that a base station (evolved Node B, eNB) has transmitted system information in the subframe.

The enhanced system information (eSI) is system information that is transmitted repeatedly at a pre-defined subframe location in a period of time. The UE does not need to determine, in each subframe by detecting whether the scheduling information is transmitted on the PDCCH, whether the system information is transmitted in each subframe. Instead, the UE combines and receives system information that is transmitted in multiple pre-defined subframes in a period of time, thereby achieving an object of enhancing system information.

Multiple transmission periods of SI may constitute one modification period of the SI. In one modification period of the SI, content of the transmitted SI is the same and does not change. If the SI needs to be changed, the SI can be generally changed only at the beginning of one modification period of the SI, so as to meet a requirement that content of the SI in one modification period of the SI is the same.

Similarly, multiple transmission periods of eSI may constitute one modification period of the eSI. In one modification period of the eSI, content of the transmitted eSI is the same and does not change. If the eSI needs to be changed, the eSI can be generally changed only at the beginning of one modification period of the eSI, so as to meet a requirement that content of the eSI in one modification period of the eSI is the same.

Step 102: Transmit the enhanced system information in an enhanced transmission manner in the modification period of the enhanced system information according to a configured time-sequence location.

One modification period of the eSI may include multiple subframes, and the enhanced system information may be transmitted in the enhanced transmission manner at a pre-configured subframe location. Specifically, for example, one modification period includes 1000 subframes, and the enhanced system information may be configured to transmit at a location configured between the $100^{th}$ and the $300^{th}$ subframes or the enhanced system information may be configured to transmit at a location configured between the $200^{th}$ and the $400^{th}$ subframes.

Specifically, in one transmission period of the SI, fewer transmission resources are occupied for transmitting the SI; therefore, the SI may be transmitted at a higher frequency. However, in one transmission period of the eSI, more transmission resources are occupied for transmitting the eSI; therefore, in this embodiment of this application, a transmission location of the enhanced system information may be a period of time in one modification period of the eSI. There may be multiple transmission periods of the SI between two adjacent transmission periods of the eSI. In this embodiment of this application, one modification period of the eSI may include one transmission period of the eSI.

In a Long Term Evolution (LTE) system, the enhanced system information may include a master information block (MIB) and a system information block (SIB). The MIB may be transmitted in the enhanced transmission manner by using a physical broadcast channel (PBCH); and the SIB may be transmitted in the enhanced transmission manner by using a physical downlink shared channel (PDSCH).

In conclusion, in this embodiment, enhanced system information is transmitted in an enhanced transmission manner in a modification period of the enhanced system information according to a configured time-sequence location. Two adjacent transmission periods of the eSI are discontinuous, and there may be multiple transmission periods; therefore, occupied transmission resources can be reduced.

In an actual application, after a terminal that needs to receive enhanced system information receives the enhanced system information, the terminal can perform communication according to the enhanced system information all the time without receiving enhanced system information transmitted by a base station each time. When the enhanced system information changes, to make the terminal learn the change, enhanced paging information is further needed to be transmitted to the terminal. The enhanced paging information may be a paging message that is transmitted in an enhanced transmission manner, and the enhanced paging message is used to notify the corresponding terminal that the enhanced system information has changed.

Figure 2:
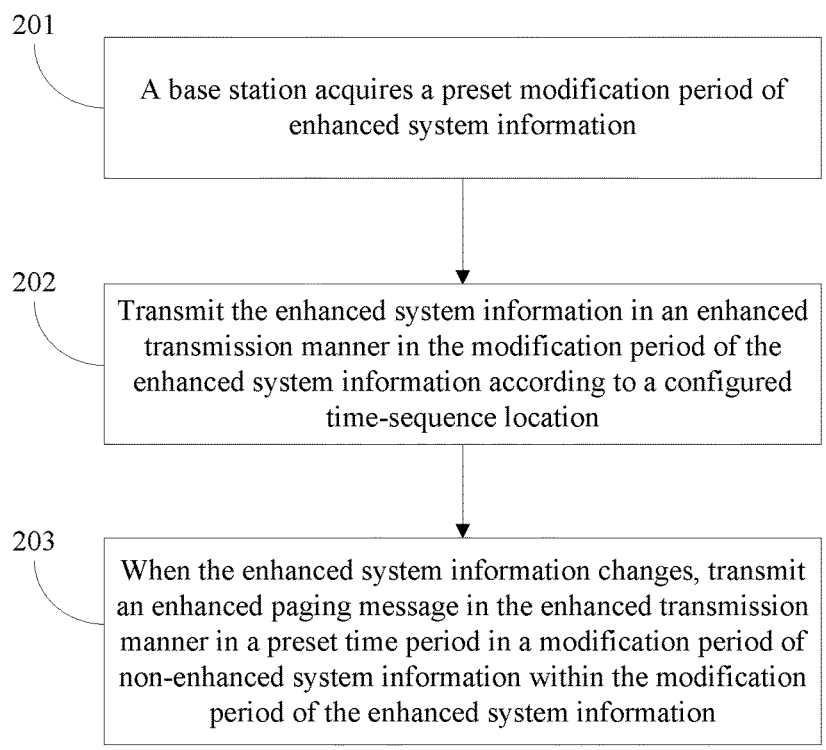
FIG. 2 is a flowchart of Embodiment 2 of a method for transmitting system information according to this application.

FIG. 2 is a flowchart of Embodiment 2 of a method for transmitting system information according to this application. As shown in FIG. 2, the method may include:

Step 201: A base station acquires a preset modification period of enhanced system information, where the enhanced system information is system information on which enhanced transmission needs to be performed; the modification period of the enhanced system information is an integer multiple of a modification period of non-enhanced system information; and the non-enhanced system information is system information that is transmitted, based on scheduling by using a control channel, in a system information window.

Step 202: Transmit the enhanced system information in an enhanced transmission manner in the modification period of the enhanced system information according to a configured time-sequence location.

Step 203: When the enhanced system information changes, transmit an enhanced paging message in the enhanced transmission manner in a preset time period in the modification period of the non-enhanced system information within the modification period of the enhanced system information, where the enhanced paging message is used to notify a corresponding terminal that the enhanced system information has changed.

After receiving the enhanced paging message, the change of enhanced system information may be determined. After receiving the enhanced paging message, the terminal may start a procedure of receiving the enhanced system information. When the base station transmits the enhanced system information again, the terminal may receive the enhanced system information, and adjust, according to the enhanced system information, related information involved in a communication process.

It should be noted that the enhanced system information may include shared information and proprietary information, where the proprietary information is radio resource configuration information related to enhanced transmission, and the shared information is radio resource configuration information that is used in both the enhanced transmission manner and a non-enhanced transmission manner. For example, the proprietary information may include a radio resource that is used when enhanced transmission is performed on a physical random access channel (PRACH), radio resource configuration information that is used when enhanced transmission is performed on a channel such as a physical downlink control channel (PDCCH) and a physical uplink control channel (PUCCH), and the like. The shared information may include uplink carrier frequency information, uplink carrier bandwidth information, and the like.

The proprietary information in a modification period of the enhanced system information is the same; and the shared information in a modification period of the non-enhanced system information is the same. That is, in one modification period of the enhanced system information, the proprietary information does not change. If two pieces of proprietary information are different, the two pieces of proprietary information inevitably exist in two modification periods of the enhanced system information. However, in one modification period of the enhanced system information, the shared information may change. This is because one modification period of the ESI may include multiple modification periods of SI, as long as it can be ensured that shared information in a same modification period of the SI is the same. Therefore, shared information used in communication between the base station and the terminal in the first modification period of the SI in a modification period of the ESI may be different from shared information used in communication between the base station and the terminal in the second modification period of the SI in the modification period of the eSI.

Because a period in which the shared information changes is different from a period in which the proprietary information changes, processing mechanisms of the terminal are different in a case in which the shared information changes and in a case in which the proprietary information changes.

Specifically, the enhanced paging message may include different identifiers, which are used to identify whether information that changes is shared information or proprietary information.

For example, the enhanced paging message (e-Paging) may include a first identifier that is used to indicate that the shared information has changed. The first identifier may be indicated by a case in which a field value of systemInfoModification in the e-Paging is true. After identifying the first identifier included in the enhanced paging information, the terminal may stop current communication, and receive changed enhanced system information when a next modification period of the enhanced system information comes. The reason why the current communication needs to be stopped is that: after the shared information changes, the base station may have performed communication by using the changed enhanced system information, while at this time, the terminal has not learned the changed enhanced system information, and the terminal cannot perform communication at this time.

The e-Paging may further include a second identifier that is used to indicate that the proprietary information has changed. The second identifier may be indicated by a case in which a field value of the systemInfoModification in the e-Paging is false and a case in which a field value of CEM-systemInfoModification in the e-Paging is true. After identifying the second identifier included in the enhanced paging information, the terminal may perform communication by continuing to use current enhanced system information, and receive the changed enhanced system information when the next modification period of the enhanced system information comes. The reason why current enhanced system information can be continued to be used to perform communication is that: the proprietary information changes in a next modification period of the enhanced system information, and before the next modification period comes, enhanced system information used by the base station does not change. Therefore, before the next modification period comes, the terminal may further perform communication by continuing to use current enhanced system information.

In the foregoing two examples, the field systemInfoModification is used to indicate whether the shared information changes, and the field CEM-systemInfoModification is used to indicate whether the proprietary information changes. If the enhanced paging message includes only the field systemInfoModification, when the field value of the systemInfoModification is true, it cannot be determined whether the proprietary information has changed or the shared information has changed.

In the foregoing case, the e-Paging may further include a third identifier that is used to indicate that the proprietary information or the shared information has changed. The third identifier may be indicated by a case in which the field value of the systemInfoModification in the e-Paging is true. After identifying the third identifier included in the enhanced paging information, the terminal may stop the current communication, and receive the changed enhanced system information when the next modification period of the enhanced system information comes.

Figure 3:
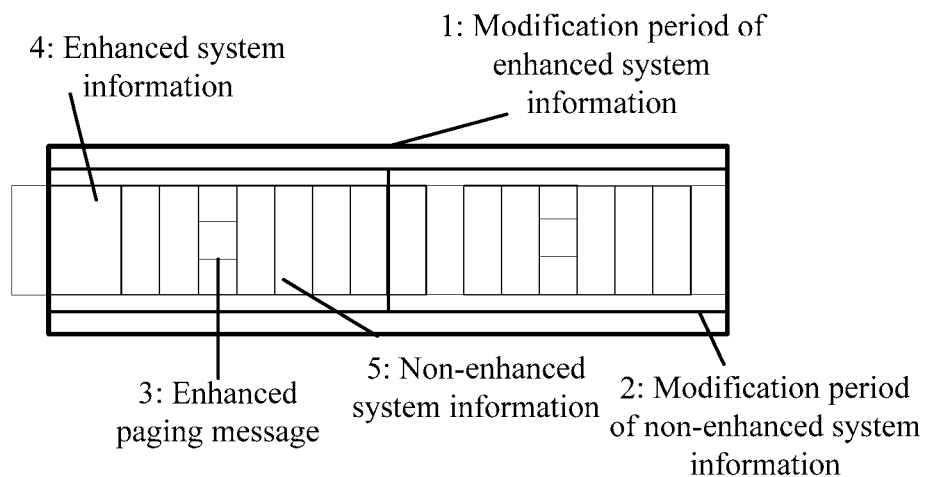
FIG. 3 is a schematic diagram of an embodiment of a relationship between a modification period of eSI and a modification period of SI and a relationship between a transmission location of the eSI and a transmission location of the SI in this application.

FIG. 3 is a schematic diagram of an embodiment of a relationship between a modification period of eSI and a modification period of SI and a relationship between a transmission location of the eSI and a transmission location of the SI in this application.

As shown in FIG. 3, different periods are represented by using boxes with different widths. A biggest box 1 represents the modification period of the eSI. A smaller box 2 represents the modification period of the SI. A box 4 represents a transmission period of the eSI. A box 5 represents a transmission period of the SI. In an example of FIG. 3, one modification period of the eSI includes one transmission period of the eSI and 16 transmission periods of the SI, where a time length of one transmission period of the eSI is equivalent to a time length of two transmission periods of the SI. One modification period of the SI includes nine transmission periods of the SI. That is, a time length of the modification period of the eSI is two times of a time length of the modification period of the SI.

In FIG. 3, the transmission period of the eSI is at a starting location of the modification period of the eSI. In an actual application, the transmission period of the eSI may also be at another location of the modification period of the eSI, for example, may be at the third and the fourth transmission periods of the SI within the modification period of the eSI.

In FIG. 3, a box 3 represents a transmission period of e-Paging. The transmission period of the e-Paging is set based on the modification period of the SI. One modification period of the SI should include at least one transmission period of the e-Paging. In an example of FIG. 3, the transmission period of the e-Paging is at the fifth transmission period of the SI within the modification period of the SI. In an actual application, the transmission period of the e-Paging may also be at another time-sequence location of the modification period of the SI.

One modification period of the eSI may include two transmission periods of the e-Paging. When shared information in the eSI changes in the second modification period of the SI within the modification period of the eSI, the e-Paging may be transmitted in the second modification period of the SI. After a terminal that needs to receive the eSI receives the e-Paging, the terminal may acquire changed eSI when the second modification period of the eSI comes.

If a modification period of the SI does not include the transmission period of the e-Paging, when the shared information in the eSI changes in the modification period of the SI, the terminal that needs to receive the eSI cannot receive the e-Paging, and cannot learn that the eSI has changed. When a base station uses changed eSI, the terminal cannot perform communication normally.

Figure 4:
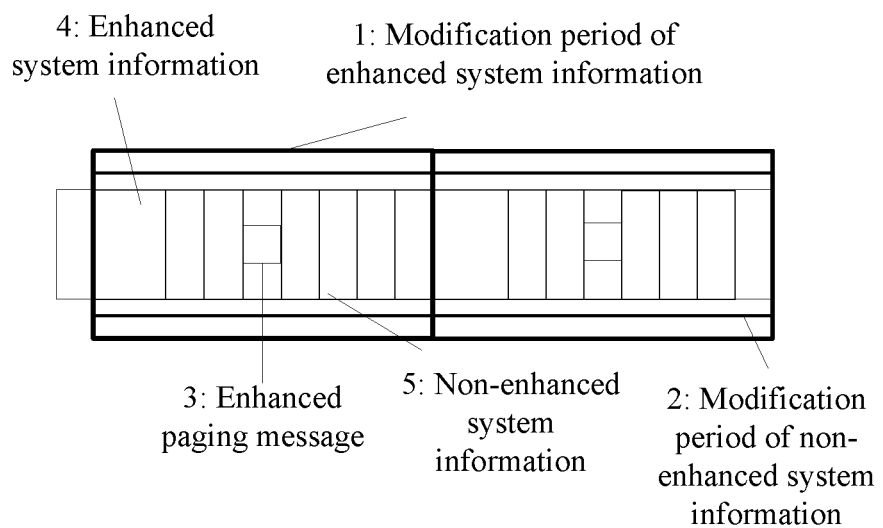
FIG. 4 is a schematic diagram of another embodiment of a relationship between a modification period of eSI and a modification period of SI and a relationship between a transmission location of the eSI and a transmission location of the SI in this application.

FIG. 4 is a schematic diagram of another embodiment of a relationship between a modification period of eSI and a modification period of SI and a relationship between a transmission location of the eSI and a transmission location of the SI in this application.

As shown in FIG. 4, different periods are represented by using boxes with different widths. A biggest box 1 represents the modification period of the eSI. A smaller box 2 represents the modification period of the SI. A box 4 represents a transmission period of the eSI. A box 5 represents a transmission period of the SI. In an example of FIG. 4, one modification period of the eSI includes one transmission period of the eSI and seven transmission periods of the SI, where a time length of one transmission period of the eSI is equivalent to a time length of two transmission periods of the SI. One modification period of the SI includes nine transmission periods of the SI. That is, a time length of the modification period of the eSI is one time of a time length of the modification period of the SI.

In FIG. 4, the transmission period of the eSI is at a starting location of the modification period of the eSI. In an actual application, the transmission period of the eSI may also be at another location of the modification period of the eSI, for example, may be at the third and the fourth transmission periods of the SI within the modification period of the eSI.

In FIG. 4, a box 3 represents a transmission period of e-Paging. The transmission period of the e-Paging is set based on the modification period of the SI. One modification period of the SI should include at least one transmission period of the e-Paging. In an example of FIG. 4, the transmission period of the e-Paging is at the fifth transmission period of the SI within the modification period of the SI. In an actual application, the transmission period of the e-Paging may also be at another time-sequence location of the modification period of the SI.

One modification period of the eSI includes one transmission period of the e-Paging. When shared information in the eSI changes in the modification period of the SI, the e-Paging may be transmitted in the second modification period of the SI. After a terminal that needs to receive the eSI receives the e-Paging, the terminal may acquire changed eSI when the second modification period of the eSI comes.

If a modification period of the SI does not include the transmission period of the e-Paging, when the shared information in the eSI changes in the modification period of the SI, the terminal that needs to receive the eSI cannot receive the e-Paging, and cannot learn that the eSI has changed. When a base station uses changed eSI, the terminal cannot perform communication normally.

In an actual application, to enable a terminal that needs to receive an enhanced paging message to receive only an enhanced paging message and a terminal that needs to receive a non-enhanced paging message to receive only a non-enhanced paging message, the enhanced paging message may be transmitted in an enhanced transmission manner by using a first time-frequency resource, where the first time-frequency resource is different from a second time-frequency resource used for transmitting the non-enhanced paging message.

When the enhanced paging message and the non-enhanced paging message are transmitted in a same subframe (that is, a same time-frequency resource), the enhanced paging message and the non-enhanced paging message may further be scrambled in different scrambling manners. Specifically, the enhanced paging message may be scrambled in a first scrambling manner, where the first scrambling manner is different from a second scrambling manner used for transmitting the non-enhanced paging message.

It should be noted that in the embodiments of this application, the configured time-sequence location may be a time-sequence location defined in a related communications protocol standard; or may be a time-sequence location set by a person skilled in the art on a base station side according to an actual application environment. After the time-sequence location is set, a base station may notify a terminal of the configured time-sequence location by means of information exchange, so that the terminal may receive the enhanced system information at the configured time-sequence location.

In the embodiments, the base station may notify the terminal of the configured time-sequence location in the following manners:

One manner is: before the enhanced system information is transmitted in an enhanced transmission manner in the modification period of the enhanced system information according to the configured time-sequence location, transmitting, to the terminal by using a physical broadcast channel, information that indicates the time-sequence location, so that the terminal receives the enhanced system information at the time-sequence location.

Another manner is: dividing the enhanced system information into at least comprising first information and second information, where the first information includes sub information that indicates a time-sequence location of the second information; and before the enhanced system information is transmitted in an enhanced transmission manner in the modification period of the enhanced system information according to the configured time-sequence location, transmitting, to a terminal by using a physical broadcast channel, information that indicates a time-sequence location of the first information, so that the terminal receives the first information at the time-sequence location, and receives the second information according to the time-sequence location, indicated by the sub information, of the second information.

Specifically, for example, a SIB may include a SIB1, a SIB2, . . . , and a SIBx. Time-sequence location information (which is equivalent to sub information of the second information) of another SIB (which is equivalent to the second information) may be included in the SIB1 (which is equivalent to the first information). The base station may notify, by using the physical broadcast channel, the terminal of a time-sequence location at which the SIB1 is transmitted; or a time-sequence location of the SIB1 may be defined in a related communications protocol standard, and the terminal receives, by using the time-sequence location of the SIB1 defined in the standard, the SIB1 transmitted by the base station. After receiving the SIB1 at the time-sequence location of the SIB1, the terminal may learn, according to sub information in the SIB1, a time-sequence location of another SIB transmitted by the base station, so that the terminal may further receive the another SIB at the time-sequence location of the another SIB.

This application further provides a method for receiving system information.

FIG. 5 is a flowchart of Embodiment 1 of a method for receiving system information according to this application. As shown in FIG. 5, the method may include:

Step 501: A terminal acquires enhanced system information transmitted by a base station in an enhanced transmission manner in a modification period of the enhanced system information according to a configured time-sequence location.

The enhanced system information is system information on which enhanced transmission needs to be performed. The modification period of the enhanced system information is an integer multiple of a modification period of non-enhanced system information. The non-enhanced system information is system information that is transmitted, based on scheduling by using a control channel, in a system information window.

The terminal includes a terminal such as a mobile phone. The terminal may be a terminal requiring coverage enhancement, for example, a terminal that is located in a relatively harsh environment.

A meaning of the non-enhanced system information is the same as or similar to that of system information (SI). The non-enhanced system information may be scheduled based on a physical downlink control channel (PDCCH), and may be transmitted in the system information window for multiple times. That is, system information is carried on a physical downlink shared channel (PDSCH); if the PDCCH channel is transmitted in a subframe of the system information window, and the channel is used to schedule the PDSCH channel that carries the system information, the system information is transmitted in the subframe, and is carried on the PDSCH channel. The system information window may be a transmission period of system information. A terminal, that is, user equipment (UE), detects, in each subframe of the system information window, scheduling information that is related to system information and that is carried on the PDCCH. If the scheduling information is detected, it indicates that a base station (evolved Node B, eNB) has transmitted system information in the subframe.

The enhanced system information (eSI) is system information that is transmitted repeatedly at a pre-defined subframe location in a period of time. The UE does not need to determine, in each subframe by detecting whether the scheduling information is transmitted on the PDCCH, whether the system information is transmitted in each subframe. Instead, the UE combines and receives system information that is transmitted in multiple pre-defined subframes in a period of time, thereby achieving an object of enhancing system information.

Multiple transmission periods of SI may constitute one modification period of the SI. In one modification period of the SI, content of the transmitted SI is the same and does not change. If the SI needs to be changed, the SI can be generally changed only at the beginning of one modification period of the SI, so as to meet a requirement that content of the SI in one modification period of the SI is the same.

Similarly, multiple transmission periods of eSI may constitute one modification period of the eSI. In one modification period of the eSI, content of the transmitted eSI is the same and does not change. If the eSI needs to be changed, the eSI can be generally changed only at the beginning of one modification period of the eSI, so as to meet a requirement that content of the eSI in one modification period of the eSI is the same.

One modification period of the eSI may include multiple subframes, and the enhanced system information may be transmitted in the enhanced transmission manner at a preconfigured subframe location. Specifically, for example, one modification period includes 1000 subframes, and the enhanced system information may be transmitted at a location configured between the $100^{th}$ and the $300^{th}$ subframes or the enhanced system information may be transmitted at a location configured between the $200^{th}$ and the $400^{th}$ subframes.

Specifically, in one transmission period of the SI, fewer transmission resources are occupied for transmitting the SI; therefore, the SI may be transmitted at a higher frequency. However, in one transmission period of the eSI, more transmission resources are occupied for transmitting the eSI; therefore, in this embodiment of this application, a transmission location of the enhanced system information may be a period of time in one modification period of the eSI. There may be multiple transmission periods of the SI between two adjacent transmission periods of the eSI. In this embodiment of this application, one modification period of the eSI may include one transmission period of the eSI.

In conclusion, in this embodiment, a terminal acquires enhanced system information transmitted by a base station in an enhanced transmission manner in a modification period of the enhanced system information according to a configured time-sequence location. Two adjacent transmission periods of the eSI are discontinuous, and there may be multiple transmission periods; therefore, occupied transmission resources can be reduced.

In an actual application, after a terminal that needs to receive enhanced system information receives the enhanced system information, the terminal can perform communication according to the enhanced system information all the time, without receiving enhanced system information transmitted by a base station each time. When the enhanced system information changes, to make the terminal learn the change, the base station may further transmit enhanced paging information to the terminal. The enhanced paging information may be a paging message that is transmitted in an enhanced transmission manner, and the enhanced paging message is used to notify the corresponding terminal that the enhanced system information has changed. The terminal may receive the enhanced paging message to learn that the enhanced system information has changed.

FIG. 6 is a flowchart of Embodiment 2 of a method for receiving system information according to this application. As shown in FIG. 6, the method may include:

Step 601: A terminal acquires enhanced system information transmitted by a base station in an enhanced transmission manner in a modification period of the enhanced system information according to a configured time-sequence location.

The enhanced system information is system information on which enhanced transmission needs to be performed. The modification period of the enhanced system information is an integer multiple of a modification period of non-enhanced system information. The non-enhanced system information is system information that is transmitted, based on scheduling by using a control channel, in a system information window.

Step 602: Acquire an enhanced paging message transmitted by the base station in the enhanced transmission manner in a preset time period in a modification period of the non-enhanced system information within the modification period of the enhanced system information, where the enhanced paging message is used to notify the corresponding terminal that the enhanced system information has changed.

Step 603: Acquire, based on an identifier included in the enhanced paging information, changed enhanced system information.

After receiving the enhanced paging message, the terminal may determine that the enhanced system information has changed. After receiving the enhanced paging message, the terminal may start a procedure of receiving the enhanced system information. When the base station transmits the enhanced system information again, the terminal may receive the enhanced system information, and adjust, according to the enhanced system information, related information involved in a communication process.

It should be noted that the enhanced system information may include shared information and proprietary information, where the proprietary information is radio resource configuration information related to enhanced transmission, and the shared information is radio resource configuration information that is used in both the enhanced transmission manner and a non-enhanced transmission manner. For example, the proprietary information may include a radio resource that is used when enhanced transmission is performed on a physical random access channel (PRACH), radio resource configuration information that is used when enhanced transmission is performed on a channel such as a physical downlink control channel (PDCCH) and a physical uplink control channel (PUCCH), and the like. The shared information may include uplink carrier frequency information, uplink carrier bandwidth information, and the like.

The proprietary information in a modification period of the enhanced system information is the same; and the shared information in a modification period of the non-enhanced system information is the same. That is, in one modification period of the enhanced system information, the proprietary information does not change. If two pieces of proprietary information are different, the two pieces of proprietary information inevitably exist in two modification periods of the enhanced system information. However, in one modification period of the enhanced system information, the shared information may change. This is because one modification period of the ESI may include multiple modification periods of SI, as long as it can be ensured that shared information in a same modification period of the SI is the same. Therefore, shared information used in communication between the base station and the terminal in the first modification period of the SI in a modification period of the ESI may be different from shared information used in communication between the base station and the terminal in the second modification period of the SI in the modification period of the ESI.

Because a period in which the shared information changes is different from a period in which the proprietary information changes, processing mechanisms of the terminal are different in a case in which the shared information changes and in a case in which the proprietary information changes.

Specifically, the enhanced paging message may include different identifiers, which are used to identify whether information that changes is shared information or proprietary information.

For example, the enhanced paging message (e-Paging) may include a first identifier that is used to indicate that the shared information has changed. The first identifier may be indicated by a case in which a field value of systemInfoModification in the e-Paging is true. After identifying the first identifier included in the enhanced paging information, the terminal may stop current communication, and receive changed enhanced system information when a next modification period of the enhanced system information comes. The reason why the current communication needs to be stopped is that: after the shared information changes, the base station may have performed communication by using the changed enhanced system information, while at this time, the terminal has not learned the changed enhanced system information, and the terminal cannot perform communication at this time.

The e-Paging may further include a second identifier that is used to indicate that the proprietary information has changed. The second identifier may be indicated by a case in which a field value of the systemInfoModification in the e-Paging is false and a case in which a field value of CEM-systemInfoModification in the e-Paging is true. After identifying the second identifier included in the enhanced paging information, the terminal may perform communication by continuing to use current enhanced system information, and receive the changed enhanced system information when the next modification period of the enhanced system information comes. The reason why current enhanced system information can be continued to be used to perform communication is that: the proprietary information changes in a next modification period of the enhanced system information, and before the next modification period comes, enhanced system information used by the base station does not change. Therefore, before the next modification period comes, the terminal may further perform communication by continuing to use current enhanced system information.

Specifically, when the proprietary information changes, the terminal may further receive the proprietary information in the changed enhanced system information only at a time-frequency location of the proprietary information.

In the foregoing two examples, the field systemInfoModification is used to indicate whether the shared information changes, and the field CEM-systemInfoModification is used to indicate whether the proprietary information changes. If the enhanced paging message includes only the field systemInfoModification, when the field value of the systemInfoModification is true, it cannot be determined whether the proprietary information has changed or the shared information has changed.

In the foregoing case, the e-Paging may further include a third identifier that is used to indicate that the proprietary information or the shared information has changed. The third identifier may be indicated by a case in which the field value of the systemInfoModification in the e-Paging is true. After identifying the third identifier included in the enhanced paging information, the terminal may stop the current communication, and receive the changed enhanced system information when the next modification period of the enhanced system information comes.

This application further provides an apparatus for transmitting system information. The apparatus may be a base station (for example, an evolved Node B).

Figure 7:
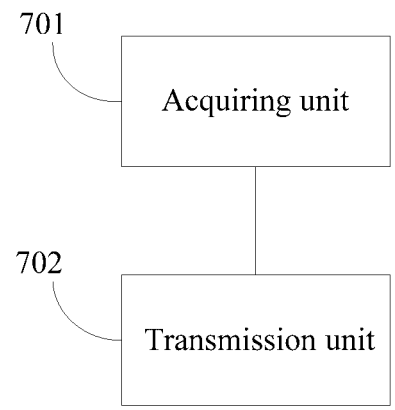
FIG. 7 is a structural diagram of an embodiment of an apparatus for transmitting system information according to this application.

FIG. 7 is a structural diagram of an embodiment of an apparatus for transmitting system information according to this application. As shown in FIG. 7, the apparatus may include:

an acquiring unit 701, configured to acquire a preset modification period of enhanced system information, where the enhanced system information is system information on which enhanced transmission needs to be performed; the modification period of the enhanced system information is an integer multiple of a modification period of non-enhanced system information; and the non-enhanced system information is system information that is transmitted, based on scheduling by using a control channel, in a system information window; and a transmission unit 702, configured to transmit the enhanced system information in an enhanced transmission manner in the modification period of the enhanced system information according to a configured time-sequence location of a period.

In conclusion, in this embodiment, enhanced system information is transmitted in an enhanced transmission manner in a modification period of the enhanced system information according to a configured time-sequence location. Two adjacent transmission periods of the eSI are discontinuous, and there may be multiple transmission periods; therefore, occupied transmission resources can be reduced.

In an actual application, the transmission unit 702 may be further configured to:

after transmitting the enhanced system information in the enhanced transmission manner according to the configured time-sequence location and when the enhanced system information changes, transmit an enhanced paging message in the enhanced transmission manner in a preset time period in the modification period of the non-enhanced system information within the modification period of the enhanced system information, where the enhanced paging message is used to notify a corresponding terminal that the enhanced system information has changed.

In an actual application, the enhanced system information includes shared information and proprietary information, where: the proprietary information is radio resource configuration information related to enhanced transmission; the shared information is radio resource configuration information that is used in both the enhanced transmission manner and a non-enhanced transmission manner; and the proprietary information in a modification period of the enhanced system information is the same, and the shared information in a modification period of the non-enhanced system information is the same.

The transmission unit 702 may be specifically configured to:

transmit, in the enhanced transmission manner, an enhanced paging message including a first identifier, where the first identifier is used to indicate that the shared information has changed; or transmit, in the enhanced transmission manner, an enhanced paging message including a second identifier, where the second identifier is used to indicate that the proprietary information has changed; or transmit, in the enhanced transmission manner, an enhanced paging message including a third identifier, where the third identifier is used to indicate that at least one of the shared information or the proprietary information has changed.

In an actual application, the transmission unit 702 may be specifically configured to:

transmit a master information block in the enhanced transmission manner by using a physical broadcast channel; and/or transmit a system information block in the enhanced transmission manner by using a physical downlink shared channel.

In an actual application, the transmission unit 702 may be specifically configured to:

transmit the enhanced paging message in the enhanced transmission manner by using a first time-frequency resource, where the first time-frequency resource is different from a second time-frequency resource used for transmitting a non-enhanced paging message.

In an actual application, the transmission unit 702 may be specifically configured to:

when the enhanced paging message and a non-enhanced paging message are transmitted in a same subframe, scramble the enhanced paging message in a first scrambling manner, where the first scrambling manner is different from a second scrambling manner used for transmitting the non-enhanced paging message.

This application further provides an apparatus for receiving system information. The apparatus may be a terminal such as a mobile phone.

Figure 8:
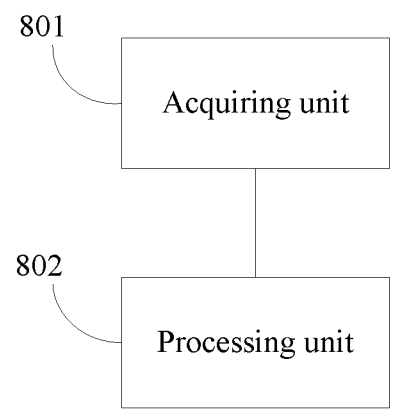
FIG. 8 is a structural diagram of an embodiment of an apparatus for receiving system information according to this application.

FIG. 8 is a structural diagram of an embodiment of an apparatus for receiving system information according to this application. As shown in FIG. 8, the apparatus may include:

an acquiring unit 801, configured to acquire enhanced system information transmitted by a base station in an enhanced transmission manner in a modification period of the enhanced system information according to a configured time-sequence location, where the enhanced system information is system information on which enhanced transmission needs to be performed; the modification period of the enhanced system information is an integer multiple of a modification period of non-enhanced system information; and the non-enhanced system information is system information that is transmitted, based on scheduling by using a control channel, in a system information window.

In conclusion, in this embodiment, a terminal acquires enhanced system information transmitted by a base station in an enhanced transmission manner in a modification period of the enhanced system information according to a configured time-sequence location. Two adjacent transmission periods of the eSI are discontinuous, and there may be multiple transmission periods; therefore, occupied transmission resources can be reduced.

In an actual application, the acquiring unit 801 may be further configured to:

after the terminal acquires the enhanced system information transmitted by the base station in the enhanced transmission manner in the modification period of the enhanced system information according to the configured time-sequence location, acquire an enhanced paging message transmitted by the base station in the enhanced transmission manner in a preset time period in the modification period of the non-enhanced system information within the modification period of the enhanced system information, where the enhanced paging message is used to notify the corresponding terminal that the enhanced system information has changed;

the apparatus may further include a processing unit 802, configured to identify an identifier included in the enhanced paging information; and the acquiring unit 801 is further configured to acquire, based on the identifier included in the enhanced paging information, changed enhanced system information.

In an actual application, the enhanced system information includes shared information and proprietary information, where: the proprietary information is radio resource configuration information related to enhanced transmission; the shared information is radio resource configuration information that is used in both the enhanced transmission manner and a non-enhanced transmission manner; and the proprietary information in a modification period of the enhanced system information is the same, and the shared information in a modification period of the non-enhanced system information is the same; the processing unit 802 is specifically configured to:

identify a first identifier included in the enhanced paging information, where the first identifier is used to indicate that the shared information has changed; and stop communication that is being currently performed; and the acquiring unit is specifically configured to receive the changed enhanced system information when a next modification period of the enhanced system information comes.

In an actual application, the processing unit 802 may be further specifically configured to:

identify a second identifier included in the enhanced paging information, where the second identifier is used to indicate that the proprietary information has changed; and perform communication by continuing to use current enhanced system information; and the acquiring unit is specifically configured to receive the changed enhanced system information when the next modification period of the enhanced system information comes.

In an actual application, the processing unit 802 may be further specifically configured to:

identify a third identifier included in the enhanced paging information, where the third identifier is used to indicate that at least one of the shared information or the proprietary information has changed; and stop the communication that is being currently performed; and the acquiring unit is specifically configured to receive the changed enhanced system information when the next modification period of the enhanced system information comes.

In an actual application, the processing unit 802 may be further specifically configured to:

receive the proprietary information in the changed enhanced system information when the next modification period of the enhanced system information comes.

In addition, an embodiment of this application further provides a computing node, where the computing node may be a host server with a computing capability, a personal computer PC, a portable computer or terminal that can be carried, or the like. Specific implementation of the computing node is not limited in a specific embodiment of this application.

Figure 9:
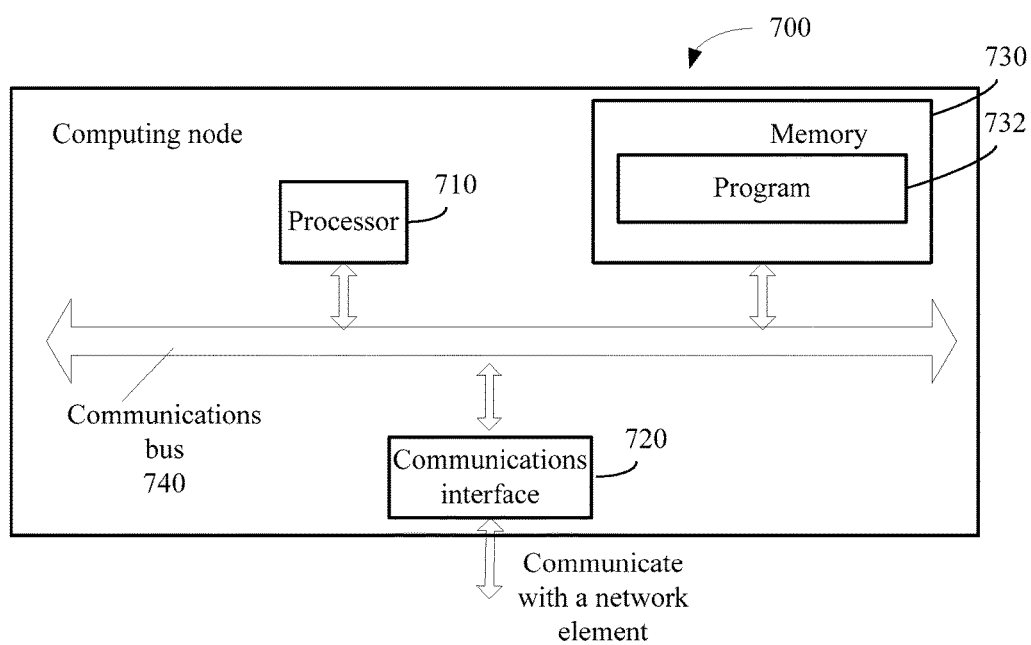
FIG. 9 is a structural diagram of a computing node according to this application.

FIG. 9 is a structural diagram of a computing node according to this application. As shown in FIG. 9, a computing node 700 includes:

a processor 710, a communications interface 720, a memory 730, and a bus 740.

The processor 710, the communications interface 720, and the memory 730 communicate with each other by using the bus 740.

The processor 710 is configured to execute a program 732.

Specifically, the program 732 may include program code, where the program code includes a computer operation instruction.

The processor 710 may be a central processing unit CPU or an application-specific integrated circuit application specific integrated circuit (ASIC), or may be configured as one or more integrated circuits that implement the embodiment of this application.

The memory 730 is configured to store the program 732. The memory 730 may include a high-speed RAM memory, and may further include a non-volatile memory, such as at least one magnetic disk memory. The program 732 may specifically include corresponding units in the embodiments shown in FIG. 7 and FIG. 8, which is not described herein again.

The embodiments in this specification are all described in a progressive manner, for same or similar parts in the embodiments, reference may be made to these embodiments, and each embodiment focuses on a difference from other embodiments. The apparatus disclosed in the embodiment is basically similar to the method disclosed in the embodiment, and therefore is described briefly; for related parts, reference may be made to partial descriptions of the method.

A person skilled in the art may be further aware that, in combination with the examples described in the embodiments disclosed in this specification, units and algorithm steps may be implemented by electronic hardware or a combination of electronic hardware and computer software. To clearly describe the interchangeability between some hardware and software, the foregoing has generally described compositions and steps of each example according to functions. Whether the functions are performed by hardware or a combination of software and hardware depends on particular applications and design constraint conditions of the technical solutions. A person skilled in the art may use different methods to implement the described functions for each particular application, but it should not be considered that the implementation goes beyond the scope of the present disclosure.

In combination with the embodiments disclosed in this specification, method or algorithm steps may be implemented by hardware, a software module executed by a processor, or a combination thereof. The software module may be configured in a random access memory (RAM), a memory, a read-only memory (ROM), an electrically programmable ROM, an electrically erasable programmable ROM, a register, a hard disk, a removable disk, a CD-ROM, or a storage medium in any other forms well-known in the art.

The foregoing descriptions of the disclosed embodiments enable a person skilled in the art to implement or use the present disclosure. Various modifications to the embodiments are obvious to the person skilled in the art, and general principles defined in this specification may be implemented in other embodiments without departing from the spirit or scope of the present disclosure. Therefore, the present disclosure will not be limited to the embodiments described in this specification but extends to the widest scope that complies with the principles and novelty disclosed in this specification.

What is claimed is:

1. A method for transmitting system information, comprising:

acquiring, by a base station, a preset modification period of enhanced system information, wherein: the enhanced system information is system information on which enhanced transmission is to be performed; the modification period of the enhanced system information is an integer multiple of a modification period of non-enhanced system information; and the non-enhanced system information is system information that is transmitted, based on scheduling by using a control channel, in a system information window; and transmitting the enhanced system information in an enhanced transmission manner in the modification period of the enhanced system information according to a configured time-sequence location.

2. The method according to claim 1, wherein after the transmitting the enhanced system information in the enhanced transmission manner according to the configured time-sequence location, the method further comprises:

in response to determining that the enhanced system information changes, transmitting an enhanced paging message in the enhanced transmission manner in a preset time period in the modification period of the non-enhanced system information within the modification period of a enhanced system information, wherein the enhanced paging message notifies a terminal that the enhanced system information has changed.

3. The method according to claim 2, wherein the enhanced system information comprises shared information and proprietary information, wherein: the proprietary information is radio resource configuration information related to enhanced transmission; the shared information is radio resource configuration information that is used in both the enhanced transmission manner and a non-enhanced transmission manner; and the proprietary information in a modification period of the enhanced system information is the same, and the shared information in a modification period of the non-enhanced system information is the same; and the transmitting the enhanced paging message in the enhanced transmission manner comprises:
transmitting, in the enhanced transmission manner, an enhanced paging message comprising a first identifier, wherein the first identifier indicates that the shared information has changed; or
transmitting, in the enhanced transmission manner, an enhanced paging message comprising a second identifier, wherein the second identifier indicates that the proprietary information has changed; or
transmitting, in the enhanced transmission manner, an enhanced paging message comprising a third identifier, wherein the third identifier indicates that at least one of the shared information and the proprietary information has changed.

4. The method according to claim 2, wherein the transmitting the enhanced paging message in the enhanced transmission manner comprises:
transmitting the enhanced paging message in the enhanced transmission manner by using a first time-frequency resource, wherein the first time-frequency resource is different from a second time-frequency resource used for transmitting a non-enhanced paging message.

5. The method according to claim 1, wherein the transmitting the enhanced system information in the enhanced transmission manner comprises one or more of:
transmitting a master information block in the enhanced transmission manner by using a physical broadcast channel; and
transmitting a system information block in the enhanced transmission manner by using a physical downlink shared channel.

6. A method for receiving system information, comprising:
acquiring, by a terminal, enhanced system information transmitted by a base station in an enhanced transmission manner in a modification period of the enhanced system information according to a configured time-sequence location,
wherein: the enhanced system information is system information on which enhanced transmission is to be performed; the modification period of the enhanced system information is an integer multiple of a modification period of non-enhanced system information; and the non-enhanced system information is system information that is transmitted, based on scheduling by using a control channel, in a system information window.

7. The method according to claim 6, wherein after the acquiring, by the terminal, the enhanced system information, the method further comprises:
acquiring an enhanced paging message transmitted by the base station in the enhanced transmission manner in a preset time period in the modification period of the non-enhanced system information within the modification period of the enhanced system information, wherein the enhanced paging message is used to notify the corresponding terminal that the enhanced system information has changed; and
acquiring, based on an identifier comprised in the enhanced paging information, changed enhanced system information.

8. The method according to claim 7, wherein the enhanced system information comprises shared information and proprietary information, wherein: the proprietary information is radio resource configuration information related to enhanced transmission; the shared information is radio resource configuration information that is used in both the enhanced transmission manner and a non-enhanced transmission manner; and the proprietary information in a modification period of the enhanced system information is the same; the shared information in a modification period of the non-enhanced system information is the same; and the acquiring, based on the identifier comprised in the enhanced paging information, the changed enhanced system information comprises:
identifying a first identifier comprised in the enhanced paging information, wherein the first identifier indicates that the shared information has changed;
stopping current communication; and
receiving the changed enhanced system information when a next modification period of the enhanced system information comes.

9. The method according to claim 7, wherein the enhanced system information comprises shared information and proprietary information, wherein: the proprietary information is radio resource configuration information related to enhanced transmission; the shared information is radio resource configuration information that is used in both the enhanced transmission manner and a non-enhanced transmission manner; and the proprietary information in a modification period of the enhanced system information is the same; the shared information in a modification period of the non-enhanced system information is the same; and the acquiring, based on the identifier comprised in the enhanced paging information, the changed enhanced system information comprises:
identifying a second identifier comprised in the enhanced paging information, wherein the second identifier indicates that the proprietary information has changed;
performing communication by continuing to use current enhanced system information; and
receiving the changed enhanced system information when a next modification period of the enhanced system information comes.

10. The method according to claim 7, wherein the enhanced system information comprises shared information and proprietary information, wherein: the proprietary information is radio resource configuration information related to enhanced transmission; the shared information is radio resource configuration information that is used in both the enhanced transmission manner and a non-enhanced transmission manner; and the proprietary information in a modification period of the enhanced system information is the same; the shared information in a modification period of the non-enhanced system information is the same; and the acquiring, based on the identifier comprised in the enhanced paging information, the changed enhanced system information comprises:
identifying a third identifier comprised in the enhanced paging information, wherein the third identifier indicates that at least one of the shared information or the proprietary information has changed;
stopping communication that is being currently performed; and receiving the changed enhanced system information when a next modification period of the enhanced system information comes.

11. An apparatus for transmitting system information, comprising:
a processor, configured to acquire a preset modification period of enhanced system information, wherein: the enhanced system information is system information on which enhanced transmission is to be performed; the modification period of the enhanced system information is an integer multiple of a modification period of non-enhanced system information; and the non-enhanced system information is system information that is transmitted, based on scheduling by using a control channel, in a system information window; and
a transmitter, configured to transmit the enhanced system information in an enhanced transmission manner in the modification period of the enhanced system information according to a configured time-sequence location.

12. The apparatus according to claim 11, wherein the transmitter is further configured to:
after transmitting the enhanced system information in the enhanced transmission manner according to the configured time-sequence location and when the enhanced system information changes, transmit an enhanced paging message in the enhanced transmission manner in a preset time period in the modification period of the non-enhanced system information within the modification period of the enhanced system information, wherein the enhanced paging message is used to notify a corresponding terminal that the enhanced system information has changed.

13. The apparatus according to claim 12, wherein the enhanced system information comprises shared information and proprietary information, wherein: the proprietary information is radio resource configuration information related to enhanced transmission; the shared information is radio resource configuration information that is used in both the enhanced transmission manner and a non-enhanced transmission manner; and the proprietary information in a modification period of the enhanced system information is the same, and the shared information in a modification period of the non-enhanced system information is the same; and
the transmitter is configured to:
transmit, in the enhanced transmission manner, an enhanced paging message comprising a first identifier, wherein the first identifier indicates that the shared information has changed; or
transmit, in the enhanced transmission manner, an enhanced paging message comprising a second identifier, wherein the second identifier indicates that the proprietary information has changed; or
transmit, in the enhanced transmission manner, an enhanced paging message comprising a third identifier, wherein the third identifier indicates that at least one of the shared information or the proprietary information has changed.

14. The apparatus according to claim 12, wherein the transmitter is configured to:
transmit the enhanced paging message in the enhanced transmission manner by using a first time-frequency resource, wherein the first time-frequency resource is different from a second time-frequency resource used for transmitting a non-enhanced paging message.

15. The apparatus according to claim 11, wherein the transmitter is configured to perform one or more of:

transmitting a master information block in the enhanced transmission manner by using a physical broadcast channel; and
transmitting a system information block in the enhanced transmission manner by using a physical downlink shared channel.

16. An apparatus for receiving system information, comprising:
a processor, configured to acquire enhanced system information transmitted by a base station in an enhanced transmission manner in a modification period of the enhanced system information according to a configured time-sequence location,
wherein: the enhanced system information is system information on which enhanced transmission is to be performed; the modification period of the enhanced system information is an integer multiple of a modification period of non-enhanced system information; and the non-enhanced system information is system information that is transmitted, based on scheduling by using a control channel, in a system information window.

17. The apparatus according to claim 16, wherein the processor is further configured to:
after the processor acquires the enhanced system information transmitted by the base station in the enhanced transmission manner in the modification period of the enhanced system information according to the configured time-sequence location, acquire an enhanced paging message transmitted by the base station in the enhanced transmission manner in a preset time period in the modification period of the non-enhanced system information within the modification period of the enhanced system information, wherein the enhanced paging message is used to notify the corresponding terminal that the enhanced system information has changed;
identify an identifier comprised in the enhanced paging information; and
acquire, based on the identifier comprised in the enhanced paging information, changed enhanced system information.

18. The apparatus according to claim 17, wherein the enhanced system information comprises shared information and proprietary information, wherein: the proprietary information is radio resource configuration information related to enhanced transmission; the shared information is radio resource configuration information that is used in both the enhanced transmission manner and a non-enhanced transmission manner; and the proprietary information in a modification period of the enhanced system information is the same, and the shared information in a modification period of the non-enhanced system information is the same; and
the processor is configured to:
identify a first identifier comprised in the enhanced paging information, wherein the first identifier indicates that the shared information has changed;
stop communication that is being currently performed; and
receive the changed enhanced system information when a next modification period of the enhanced system information comes.

19. The apparatus according to claim 17, wherein the enhanced system information comprises shared information and proprietary information, wherein: the proprietary information is radio resource configuration information related to enhanced transmission; the shared information is radio resource configuration information that is used in both the enhanced transmission manner and a non-enhanced transmission manner; and the proprietary information in a modification period of the enhanced system information is the same, and the shared information in a modification period of the non-enhanced system information is the same; and the processor is configured to:

identify a second identifier comprised in the enhanced paging information, wherein the second identifier indicates that the proprietary information has changed;

perform communication by continuing to use current enhanced system information; and receive the changed enhanced system information when a next modification period of the enhanced system information comes.

20. The apparatus according to claim 17, wherein the enhanced system information comprises shared information and proprietary information, wherein: the proprietary information is radio resource configuration information related to enhanced transmission; the shared information is radio resource configuration information that is used in both the enhanced transmission manner and a non-enhanced transmission manner; and the proprietary information in a modification period of the enhanced system information is the same, and the shared information in a modification period of the non-enhanced system information is the same; and the processor is configured to:

identify a third identifier comprised in the enhanced paging information, wherein the third identifier indicates that at least one of the shared information or the proprietary information has changed;

stop communication that is being currently performed; and receive the changed enhanced system information when a next modification period of the enhanced system information comes.

\* \* \* \* \*